United States Patent [19]

Degenhardt et al.

[11] 4,168,741

[45] Sep. 25, 1979

[54] APPARATUS FOR AMMONIA FEED IN COPYING EQUIPMENT

[75] Inventors: Karl-Heinz Degenhardt, Bad Schwalbach; Gerhard Marx, Taunusstein; Hermann Frank, Niederwalluf, all of Fed. Rep. of Germany

[73] Assignee: Hoechst Aktiengesellschaft, Fed. Rep. of Germany

[21] Appl. No.: 846,335

[22] Filed: Oct. 28, 1977

[30] Foreign Application Priority Data

Oct. 30, 1976 [DE] Fed. Rep. of Germany ....... 2649975

[51] Int. Cl.[2] ........................ A23C 3/02; F25D 17/06; B01D 51/00; B01D 7/00

[52] U.S. Cl. .......................................... 165/66; 62/95; 55/269; 23/294 R

[58] Field of Search ........................ 165/66; 62/95, 93; 23/294 R, 264; 55/269

[56] References Cited

U.S. PATENT DOCUMENTS

| | | | |
|---|---|---|---|
| 2,281,168 | 4/1942 | Paget | 165/66 |
| 3,096,255 | 7/1963 | Redenbaugh | 165/66 |
| 3,492,831 | 2/1970 | Maurer et al. | 62/93 |
| 4,002,198 | 1/1977 | Wagner et al. | 165/61 |

FOREIGN PATENT DOCUMENTS

| | | | |
|---|---|---|---|
| 2337961 | 2/1975 | Fed. Rep. of Germany | 165/66 |

*Primary Examiner*—Charles J. Myhre

*Assistant Examiner*—M. Moy

*Attorney, Agent, or Firm*—James E. Bryan

[57] ABSTRACT

This invention relates to an improvement in an apparatus for ammonia feed in copying equipment with a cold trap, for freezing out ammonia and water from air extracted from the immediate vicinity of a developing chamber, in particular from pre-chambers, together with a rectifying column for releasing ammonia from the frozen-out ammonia-water mixture and recycling the gaseous ammonia into the developing chamber, the improvement comprising heat exchanger means, with two heat-conducting channels adjacent each other through which the extracted air flows counter-currently, a cold source in said heat exchanger means, said source being at a transition position between said channels and surrounded thereby, heat source means adapted to heat said heat exchanger means, outlet means on said heat exchanger means, means connecting said outlet means on said heat exchanger means to said rectifying column, and means connecting said rectifying column to said developing chamber.

8 Claims, 4 Drawing Figures

APPARATUS FOR AMMONIA FEED IN COPYING EQUIPMENT

The invention relates to an apparatus for ammonia feed in copying equipment.

A process for the removal of the extracted air extracted from the immediate vicinity of a development chamber by an arrangement with one or more cold traps for taking up ammonia from the extracted air and with a rectifying column for the subsequent release of the frozen-out ammonia and for the recycling of the ammonia to the development chamber, is known from German Offenlegungsschrift No. 2,337,961.

This process is advantageous inasmuch as a carrier for taking up the ammonia is dispensed with and hence the problems of the regeneration of the carrier are eliminated. In addition it is advantageous that this known process operates essentially as a dry process.

The object upon which the present invention is based is to provide an apparatus for carrying out this known process which apparatus makes the best possible utilization of the cooling energy supplied to the cold trap. The apparatus for taking up the ammonia from the extracted air and for recycling the ammonia to the development chamber should work continuously at least during the customary daily shift period of a photocopying machine or a duplicating machine.

Good utilization of the cooling energy for cooling the exhaust air and for freezing out the ammonia and water constituents contained therein is provided because the cold trap is constructed with two heat-conducting channels adjacent each other, through which the extracted air flows counter-currently, and with a cold source at the junction point between the first and the second channel. However, such a cold trap in itself operates discontinuously because during the freezing-out, ammonia in aqueous ammonia also precipitates as a solid phase which thus has to be heated prior to subsequent re-use and further transmission. In the latter case, however, the cold trap cannot take up further ammonia and water. In order nevertheless to achieve a continuous mode of working at least during the customary daily shift period of a duplicating machine, a sufficiently large collecting vessel is provided, between the cold trap and the rectifying column, in which the ammonia-containing developer gas is produced. During operation of the duplicating machine ammonia and water are frozen out of the extracted air while the ammonia-water mixture, which has earlier flowed out of the cold trap into the collecting vessel, gradually and continuously flows from the latter into the rectifying column wherein a material transfer with release of ammonia-containing developer gas can take place counter-currently to a rising flow of water vapor. After the daily shift of the duplicating machine the cooling energy is no longer applied to the cold trap and the frozen-out ammonia and the water can thaw and flow into the collecting vessel for the next operating period of the duplicating machine. In this connection, the construction of the cold trap as a special heat exchanger for the favorable utilization of the cooling energy is particularly effective because the flows in the two channels are in opposite directions, and the cold source is located centrally therein, to which the exhausted air is there exposed virtually directly, and is shielded externally by the channels.

The rectifying column is composed of a packed column, in which packings, for example Raschig rings, are heaped up on a sieve tray, and which, below the sieve tray, leads into a vaporizer in which water is vaporized. The water vapor rising from below through the packings causes the developer gas, composed of ammonia and water vapor, to be released from the aqueous ammonia solution which is flowing downwardly at the same time, and to be able to flow through the top of the rectifying column to the developing chamber. Water which is virtually free from ammonia therefore flows into the vaporizer. Hence, surplus remaining water can be discharged into the environment without hesitation. This is necessary because the water/ammonia ratio in the extracted air is greater, because of the amount of air extracted from the room atmosphere, with its additional humidity, than in the developer chamber.

Altogether therefore the success desired is achieved by an effective construction of the cold trap and a special combination of this cold trap with a collecting vessel and a rectifying column.

In a specially advantageous design of the heat exchanger used as a cold trap the two channels of the heat exchanger are constructed as a double spiral which surrounds the cold source. This heat exchanger operates with good thermal efficiency and has a low cost of manufacture.

Appropriately, a cooling spiral is provided as the cold source in the heat exchanger and is connected to a cooling unit. The cooling unit can be one which is customarily used in refrigerators and is a mass-produced item, so the expenditure for the apparatus thus can be kept low.

A device for dripping liquid nitrogen onto the inner junction of the two channels of the double spiral can be provided as a cold source in place of the cooling spiral. The last mentioned possibility is particularly advantageous because by a switching over, discussed below, of the heat exchanger the cold source can act, without noticeable delay, on the extracted air passed through the heat exchanger.

As a heat source for thawing the heat exchanger, an electrically heated base plate is appropriately provided under its channels. Thus the heat can act uniformly on the channels and on the material frozen-out therein.

To replenish the gaseous developer medium in the developing chamber, which developer medium is necessarily carried out by the duplicating material, a supply vessel for fresh aqueous ammonia solution is additionally connected into the heat of the rectifying column. Thus the rectifying column is utilized especially favorably not only for the recovery of the circulated ammonia but also for the production of new developer gas.

One embodiment of the apparatus for the ammonia feed in the duplicating equipment is very particularly appropriate. By this means a continuous removal of the ammonia from the extracted air is made possible, and with a relatively small collecting vessel developer gas containing ammonia is continuously released over, in fact, unlimited periods.

This arrangement for continuously freezing out ammonia and water from the extracted air is controlled by a control unit. The control unit can give signals after preset time intervals, for which purpose the control unit contains a timer. It is, however, also possible for the quantity or the volume or the height of the frozen-out material in the heat exchangers to be measured and the measured result used by the control unit for the formation of the signals.

A process, for operating the apparatus for continuously freezing out ammonia and water from the extracted air over virtually unlimited periods, appropriately can be designed in such a manner that the heat exchanger, through which the extracted air is to be passed in a subsequent operating phase, is already cooled before the admission of the extracted air, while the other heat exchanger, which in the immediately previous operating phase is still subjected to extracted air, is cut off from the coolant stream. By matching this switchover of the coolant feed prior to the switchover of the extracted air, to the heat-conducting delay in the heat exchangers, it is possible to ensure that the ammonia take-up in the heat exchanger is not interrupted during the switchover.

The invention will be further illustrated by reference to the accompanying drawings, in which.

The heat exchanger used as a cold trap is described first, it being an essential component of the apparatus for freezing out ammonia.

Figure 1:
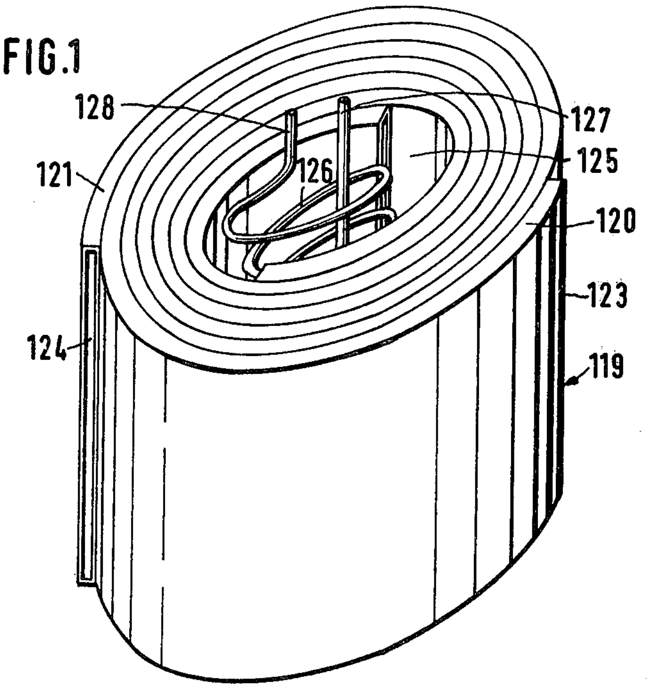
FIG. 1 shows, in perspective view, a heat exchanger serving as a cold trap.
Figure 2:
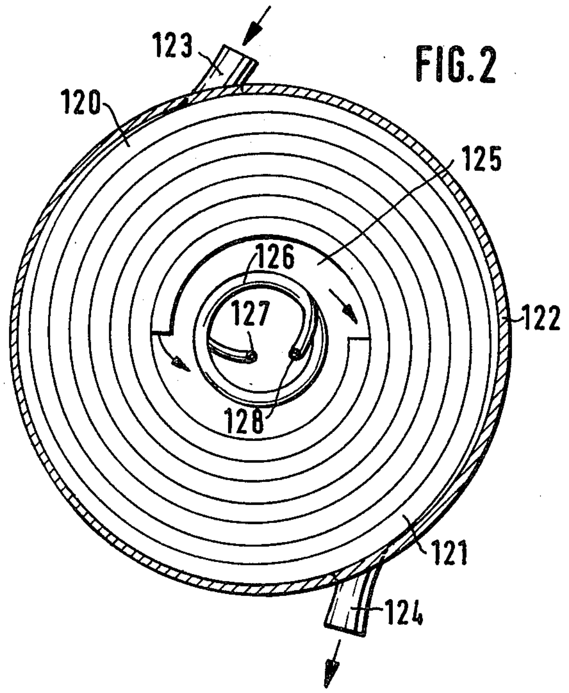
FIG. 2 shows a view, from above, of the heat exchanger according to FIG. 1.
Figure 3:
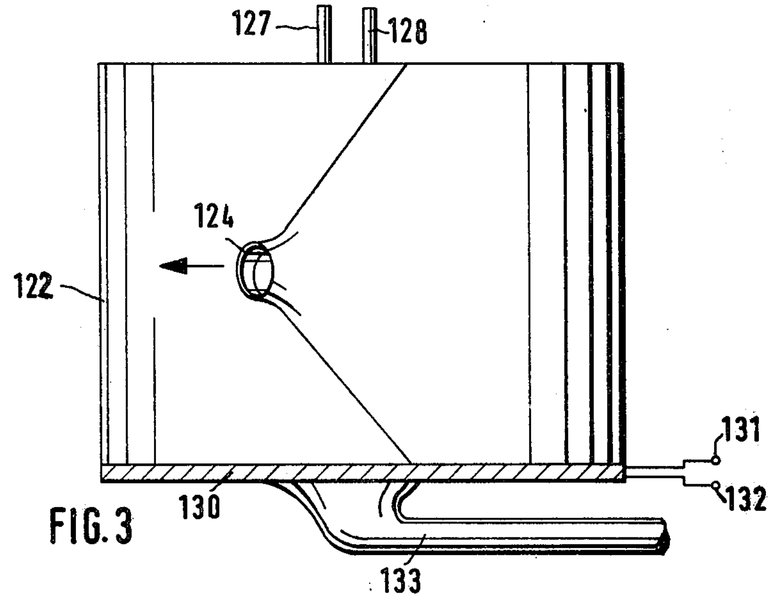
FIG. 3 shows a side view of the heat exchanger according to FIGS. 1 and 2, but with an additional casing.

FIG. 1 shows a double-channel heat exchanger 119, without a surrounding sheet metal casing. The heat exchanger channels 120, 121 which, as FIG. 2 shows in particular, are wound spirally over one another. Whereas in FIG. 1 only the heat exchanger channels, with their connections and the cooling spiral are represented, the heat exchanger in plan view and in side view according to FIG. 3 is surrounded by a sheet metal casing 122 which also forms the cover and bottom, not represented in FIG. 2, of the heat exchanger. The channel 120 has an inlet 123 while the channel 121 is provided with an outlet 124. The inlets in FIG. 2 and FIG. 3 are constructed as nozzles. The two channels are in open connection with each other in the center 125 of the spiral. A cooling spiral 126, connected to a cooling unit is provided in the center of the spiral. It has a coolant inlet 127 and a coolant outlet 128.

FIG. 3 further shows a base plate 130 provided with electric heating, the electrical connections of the heater being designated by the numbers 131,132. The base plate has a perforation through which a discharge pipe 133 leads to the center of the spiral, into which center the spiral channels open.

Figure 4:
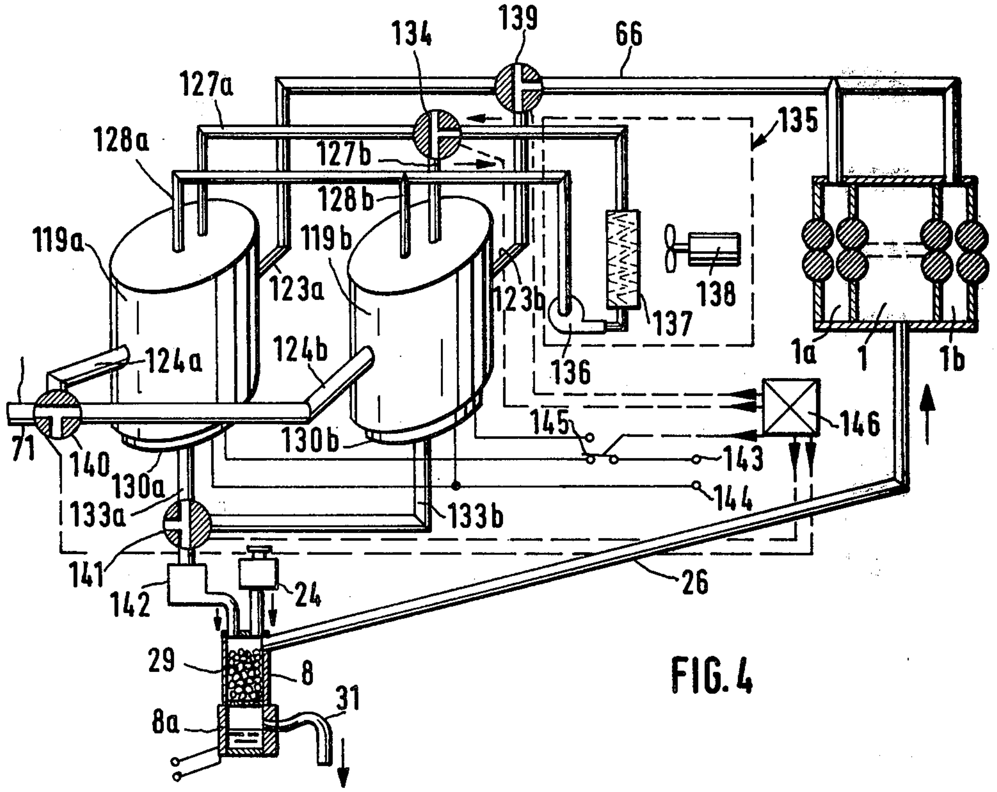
FIG. 4 shows an arrangement with two exchangers for the ammonia feed in a duplicating machine.

FIG. 4 shows an ammonia circulation system, constructed with two heat exchangers which are constructed as cold traps. The heat exchangers are here designated by 119*a* and 119*b*. The coolant inlets 127*a*, 127*b* are connected to a cooling unit 135 via a three-way valve 134. The coolant outlets 128*a*, 128*b* are permanently connected to the cooling unit 135. The cooling unit 135 is composed of a compressor 136 and a cooler 137 with which a fan 138 is associated.

The inlets 123*a*, 123*b* of the heat exchangers are connected, via a second three-way valve 139 to an extraction line 66 which is connected to the prechambers 1*a*, 1*b*. The outlets 124*a*, 124*b* of the heat exchangers can be connected to the air-extraction line 71 via a third three-way valve 140. The connecting lines 133*a*, 133*b* are connected to a collecting vessel 142, via a fourth three-way valve 141. The collecting vessel feeds a packed column 8.

The packed column contains a packing 29, for example of Raschig rings, which are separated from a vaporizer 8*a*, located below, by a sieve tray. The vaporizer can be heated electrically by a ring heater. The vaporizer is furthermore provided with a siphon 31 which provides a gas-tight seal against the environment. Surplus waste water, which is substantially free from ammonia, flows out of it. At the top of the packed column, a supply vessel 24 for fresh aqueous ammonia solution is also connected, from which solution the developer gas, which is to be fed into the circulation, can be produced. The developer gas line, leading from the top of the packed column 8 to the developing chamber, is designated 26.

FIG. 4 further shows how an electric current source, which can be connected to the terminals 143, 144, can be switched, as desired, according to the position of the switch 145, to the heatable base plate 130*a* or to the base plate 130*b*.

A control unit 146 serves to actuate the three-way valves 134, 139, 140,141 as well as the switch 145, and controls the position of the components according to a preset time sequence.

In the illustrated position of the three-way valves 134, 139, 140, 141 as well as in the illustrated position of the switch 145, the heat exchanger 119*b* operates as a take-up station, while the heat exchanger 119*a*, together with the packed column 8, acts as a discharging station.

In this case the coolant flows through the cooling spiral of the heat exchanger 119*b* and is cooled in the cooling unit 135. The extracted air, containing ammonia, is extracted from the prechambers 1*a*, 1*b* by a pump, not shown and, in the operating phase shown, flows into the inlet 123*b* of the heat exchanger 119*b*. In the heat exchanger the extracted air flows through a first heat exchanger channel into the center of the spiral, there flows around the cooling spiral 126 and passes over into the second heat exchanger channel. From this it flows out as exhaust air through the outlet 124*b* into the exhaust air line 71. The extracted air exchanges heat, through the walls of the heat exchanger channels, between the inlet 123 and the center of the spiral, with the cold exhaust air which flows in counter-currently to it out of the center of the spiral. A favorable utilization of the cold available from the cooling spiral is thereby achieved. The ammonia and water which freeze out of the extracted air upon passing through the heat exchanger, collect in the form of condensate and ice at the bottom and on the walls of the heat exchanger until the heat exchanger is almost full.

The heat exchanger 119*a* is heated electrically in this operating phase until the accumulated amount of ammonia and water has thawed, and is cooled down before renewed introduction of the extracted air. For thawing, the base plate 130*a* heats the heat exchanger 119*a* so that the ammonia-water mixture can flow out of the channels into the open center of the spiral and can from there flow out via the outlets 133*a* and 141. The ammonia-water mixture flows in this case into the collecting vessel 142 and from there into the packed column 8 in which developer gas containing ammonia is obtained from the ammonia-water mixture by material transfer with the vapor rising from the vaporizer. The water flowing from the packed column 8 into the vaporizer 8*a* has, to a large extent, been freed from ammonia. If the water is not vaporized for producing the vapor stream for the packed column, it flows as waste water out through the outlet 31. Ammonia losses are replenished by feeding-in fresh ammonia water from the supply vessel 24.

When the volume of ammonia-water, which has been accumulated in the heat exchanger 119*a*, still has not completely thawed and flowed out; the coolant is already diverted via the three-way valve 134 into the coolant inlet 127*a* and the current heating the base plate 130*a* is cut off therefrom. The remaining three-way valves 139, 140 and 141 remain at first in their previous positions. Because of the delays in the heat conduction in the heat exchangers 119*a*, 119*b*, this ensures that the heat exchanger 119*b* still first acts as a cold trap, but that the cooling of the heat exchanger 119*a* is initiated sufficiently promptly that at the start of the subsequent operating phase it serves as a cold trap and ensures continuous release of ammonia from the extracted air.

In this new operating phase the switch 145 is turned to the other switching position so that now the heat exchanger 119*b* is heated. The three-way valves 139 and 140 are switched over and the extracted air flows through the heat exchanger 119*a*. The three-way valve 141 is turned into the position in which the ammonia-water mixture flows out of the heat exchanger 119*b* into the collecting vessel 142. Overall in this position of the switchable components, the heat exchanger 119*a* acts as a take-up station and the heat exchanger 119*b* functions, together with the packed column, as a release station.

In the next operating phase the heat exchangers again carry out their initially described functions.

In place of the cooling spirals in the heat exchangers 119*a*, 119*b* other cold sources can be provided, for example those working with a vaporizing liquid. For this purpose, for example, liquid nitrogen can be dripped into the center of the heat exchanger.

The timing sequence in which the control unit 146 gives its signals to the switchable components 134, 139, 140, 141 and 145 must in this process be adapted to the time behavior of the heat exchangers, in particular upon cooling, so that the heat exchanger is charged with extracted air only when the heat exchanger is sufficiently cooled down for freezing out the ammonia.

It will be obvious to those skilled in the art that many modifications may be made within the scope of the present invention without departing from the spirit thereof, and the invention includes all such modifications.

What is claimed is:

1. In an apparatus for ammonia feed in copying equipment with a cold trap, for freezing out ammonia and water from air extracted from the immediate vicinity of a developing chamber in particular from prechambers, together with a rectifying column for releasing ammonia from the frozen-out ammonia-water mixture and recycling the gaseous ammonia into the developing chamber by means connecting said rectifying column to said developing chamber, the improvement comprising a pair of heat exchanger means, each of said heat exchanger means having two heat-conducting channels adjacent each other, through which the extracted air flows counter-currently and being constructed as a double spiral, a cold source in each of said heat exchanger means, said source being at a transition position between said channels and surrounded by the double spiral, heat source means adapted to heat each of said heat exchanger means and being a heatable base plate mounted below the channels of each of the heat exchanger means, outlet means on each of said heat exchanger means, and means adapted to connect each of said outlet means on said heat exchanger means to said rectifying column.

2. Apparatus according to claim 1 in which said cold source includes a cooling spiral connected to a cooling unit means.

3. Apparatus according to claim 1 in which said cold source includes means for dripping liquid nitrogen onto said transition position between said channels.

4. Apparatus according to claim 1 including supply means, for fresh aqueous ammonia solution, connected to the top of said rectifying column.

5. Apparatus according to claim 1 including gas inlet and gas outlet means on each of said heat exchanger means, first valve means whereby said heat exchanger means can be alternately connected to a cooling unit, second valve means whereby said heat exchanger means can be alternately connected by their gas inlets to pre-chambers on inlet and outlet orifices of the developing chamber, third valve means whereby said heat exchanger means can be alternately connected by their gas outlets to an exhaust air line, fourth valve means whereby said heat exchanger means can be alternately connected to a collecting vessel, and change-over switch means whereby said heat source means can be alternately switched on.

6. Apparatus according to claim 5 in which said valve means are three-way valves.

7. Apparatus according to claim 6 including control unit means which in a first operating phase gives a signal to said first valve means to connect said cooling unit to a second of said heat exchanger means, a signal to said second and third valve means to permit extracted air to pass through said second heat exchanger means, a signal to said fourth valve means to connect a first of said heat exchanger means to said collecting vessel, a signal to the change-over switch to heat said first heat exchanger means, and said control unit means in a second operating phase giving a signal to said first valve means to connect said cooling unit to said first heat exchanger means, a signal to said second and third valve means to permit extracted air to pass through said first heat exchanger means, a signal to said fourth valve means to connect said second heat exchanger means to said collecting vessel, and a signal to said change-over switch to heat said second heat exchanger means.

8. An apparatus according to claim 7 in which before switching the second, third, and fourth valve means from the first into the second operating phase, said first valve means is actuated, so that said first heat exchanger has cooled down when, in the second operating phase, it is subjected to extracted air.

* * * * *